United States Patent [19]

Weber et al.

[11] Patent Number: 5,603,785
[45] Date of Patent: Feb. 18, 1997

[54] TIRE INCLUDING TWO AQUACHANNELS ON ONE SIDE

[75] Inventors: Michael J. Weber, Mogadore; John G. Stucker, Stow, both of Ohio

[73] Assignee: The Goodyear Tire & Rubber Company, Akron, Ohio

[21] Appl. No.: 239,104

[22] Filed: May 6, 1994

[51] Int. Cl.$^6$ ...................................................... B60C 111/00
[52] U.S. Cl. ............................................................ 152/209 A
[58] Field of Search ........................... 152/209 R, 209 D, 152/209 A; D12/147

[56]      References Cited

U.S. PATENT DOCUMENTS

| | | |
|---|---|---|
| D. 324,839 | 5/1992 | Maxwell et al. . |
| D. 342,224 | 12/1993 | Graas et al. ............................ D12/147 |
| D. 347,412 | 5/1994 | Croyle .................................... D12/147 |
| D. 355,154 | 2/1995 | Croyle et al. ........................... D12/147 |
| 4,700,762 | 10/1987 | Landers . |
| 4,953,604 | 9/1990 | Shepler et al. . |
| 4,984,616 | 1/1991 | Shepler et al. . |
| 5,002,109 | 3/1991 | Shepler et al. . |
| 5,176,766 | 1/1993 | Landers et al. . |
| 5,178,699 | 1/1993 | Kakumu et al. . |
| 5,209,793 | 5/1993 | Cusimano ............................ 152/209 R |
| 5,327,952 | 7/1994 | Glover et al. ........................ 152/209 R |
| 5,329,980 | 7/1994 | Swift et al. ........................... 152/209 A |
| 5,425,406 | 6/1995 | Swift et al. ........................... 152/209 R |
| 5,439,040 | 8/1995 | Iwamura et al. ..................... 152/209 R |
| 5,450,885 | 9/1995 | Hanya .................................. 152/209 R |

FOREIGN PATENT DOCUMENTS

| | | | |
|---|---|---|---|
| 0139606 | 5/1985 | European Pat. Off. . | |
| 1480462 | 6/1969 | Germany . | |
| 2536470 | 2/1977 | Germany . | |
| 3723368 | 3/1989 | Germany . | |
| 60-55607 | 4/1985 | Japan . | |
| 175205 | 7/1987 | Japan ................................ | 152/209 R |
| 45203 | 2/1990 | Japan ................................ | 152/209 R |
| 246104 | 11/1991 | Japan ................................ | 152/209 R |
| 108004 | 4/1992 | Japan ................................ | 152/209 D |
| 115317 | 4/1994 | Japan ................................ | 152/209 D |
| 2193933 | 2/1988 | United Kingdom . | |

OTHER PUBLICATIONS

Automotive Engineering/Oct. 1992, pp. 23–28.

*Primary Examiner*—Steven D. Maki
*Attorney, Agent, or Firm*—David E. Wheeler

[57]      ABSTRACT

Improved tires designed for use in an improved tire/vehicle system having two pneumatic front tires and two pneumatic rear tires are provided. The improved tire/vehicle system is especially effective on wet road surfaces. The front tire treads are each divided circumferentially into first, second, and third zones. The rear tire treads are divided circumferentially into four zones. Both the front and rear tires have tread groove patterns that are asymmetric and are especially configured for tires having negative camber.

2 Claims, 5 Drawing Sheets

TIRE INCLUDING TWO AQUACHANNELS ON ONE SIDE

BACKGROUND OF THE INVENTION

1. Field of Invention

This invention relates generally to tires and to tire/vehicle systems designed for four-wheeled automotive vehicles, and specifically for such systems wherein a portion of the rear tire tread tracks a front tire tread, and even more specifically for a tire/vehicle system where the wheels are cambered.

2. Description of the Prior Art

In automotive vehicles, proper traction between the tire and the road surface is necessary for effective operation of the vehicle. Under certain weather conditions, such as rain, moisture or water can be deposited on the road surface and tire traction can be impaired. For example, a vehicle traveling on a rain-soaked road surface at high speed can "hydroplane" and the tires of the vehicle can lose contact with the road surface altogether. For this reason, it is desirable that tires be designed to channel water away from the footprint of the tire, to improve contact between the tire and road surface. U. S. Pat. No. 5,176,766 discloses a tire tread designed to provide good traction, especially on road surfaces covered with water.

Four-wheeled vehicles are usually fitted with identical tires at all four wheel positions, even though the operating conditions and performance requirements at each wheel may be different. For example, the functions necessarily performed by each tire, such as steering, load bearing, and transmitting driving torque from the engine to the road surface, are usually different at each wheel position.

Some tire designers have sought to maximize vehicle performance by tuning each tire to its respective wheel position. German Patent 1,480,962 discloses a front and rear tire combination in which the compound in the front tire is different from that in the rear tire, the combination designed to improve treadwear. German Patent 2,536,470 discloses a front and rear tire combination in which the tread pattern on the front tire is varied slightly from the tread pattern on the rear tire to limit the noise generated by the combination. Japanese Patent 58-164360 discloses a front and rear tire combination in which the tread pattern of the front tire differs from that of the rear tire in order to maximize the cornering characteristics of the vehicle. U.S. Pat. No. 4,984,616 discloses an automotive tire/vehicle system mainly for use on dry surfaces.

The present invention relates to a vehicle and tire system designed to improve wet traction.

SUMMARY OF THE INVENTION

Pneumatic tires are claimed comprising a pair of annular beads, at least one carcass ply wrapped around the beads, and tread disposed radially over the carcass ply in a crown area of the tire, and sidewalls disposed between the tread and beads. In a tire which is used as a front tire in the illustrated embodiment of the tire vehicle system, the tread comprises: a first zone comprising 35–50% of the width of the tread and having lateral grooves longer than the width of the zone; a second zone (in a center portion of the tire) which comprises 25–35% of the width of the tread and has a first aquachannel contained in the zone which has a width of 7–13% of the width of the tire tread; and a third zone comprising 25–35% of the width of the tire tread and having a second aquachannel contained therein which comprises 5–11% of the width of the tire tread; and both aquachannels are located on one side of the equatorial plane of the tire. In the illustrated embodiment, the edges of the zones are defined by continuous circumferential grooves.

In a tire which is used as a rear tire in the illustrated embodiment of a tire/vehicle system, the tread comprises: a first zone comprising 25–31% of the width of the tire tread, having lateral grooves longer than the width of the zone; a second zone comprising 22–30% of the width of the tire tread, having substantially parallel lateral grooves angled at ±30° to ±60° with respect to the equatorial plane of the tire; a third zone comprising 14–22% of the width of the tire tread, and having a first aquachannel therein; and a fourth zone comprising 15–26% of the width of said tire tread, and having a second aquachannel therein. The aquachannels in the rear tire each have a width comprising 4–8% of the tread width. Also, each of the four zones is defined at its edge by a continuous circumferential groove.

When the front and rear tires of the invention are mounted on a tire/vehicle system of the invention, at least a portion of each rear tire tracks a front tire. Specifically, the first and second zones of the rear tire track the front tire, and the aquachannels of the rear tire (in the third and fourth zones) are aligned to track off the edge of the front tire.

In an illustrated embodiment, tires of the invention are designed to accommodate a camber, and in such an embodiment aquachannels are located in the portion of the tread surface corresponding to the longest portion of the footprint.

DEFINITIONS

The invention also may be better understood in the context of the following definitions, which are applicable to both the specification and to the appended claims:

"Pneumatic tire" means a laminated mechanical device of generally toroidal shape (usually an open-torus) having beads and a tread and usually made of rubber, chemicals, fabric and steel or other materials. When mounted on the wheel of a motor vehicle, the tire through its tread provides traction and contains the fluid that sustains the vehicle load.

"Equatorial plane (EP)" means the plane perpendicular to the tire's axis of rotation and passing through the center of its tread.

"Aquachannel" refers to an extra wide circumferential groove with angled (non-parallel), rounded groove walls designed specifically to improve the flow of water and to channel water out of the footprint of the tire.

"Casing" means the carcass, belt structure, beads, sidewalls, and all other components of the tire excepting the tread and undertread. The casing may be new, unvulcanized rubber or previously vulcanized rubber to be fitted with a new tread.

"Tread" means a molded rubber component which, when bonded to a tire casing, includes that portion of a tire that comes into contact with the road when the tire is normally inflated and under normal load.

"Tread width" means the arc length of the tread surface in the axial direction, that is, in a plane passing through the tire's axis of rotation.

"Footprint" means the area of contact of the tire tread with a flat surface under normal load and pressure or under specified load, pressure and speed conditions.

"Net-to-gross ratio" means the ratio of the area of the tire tread rubber that makes contact with the road surface while in the footprint, divided by the area of the tread in the footprint, including non-contacting portions such as grooves.

"Tracking" means that in a tire/vehicle system where two tires are mounted on separate axles so that a front tire precedes a rear tire when the vehicle is being normally operated in a straight line, the rear tire contacts the same portions of the road surface as did the front tire. If the rear tire is wider than the front tire, only a portion of the rear tire may track the front tire.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Axial" and "axially" are used herein to refer to lines or directions that are substantially parallel to the axis of rotation of the tire.

"Radial" and "radially" are used herein to mean directions radially toward or away from the axis of rotation of the tire.

"Slip Angle" means the angular difference between a wheel's equatorial plane EP and the equatorial plane EP of a tire mounted on that wheel when the vehicle on which the wheel and tire are mounted is in the process of turning.

DESCRIPTION OF THE PREFERRED EMBODIMENTS

In the figures, the same numerals are used for the same components or items in the several views unless otherwise specified.

Figure 1:
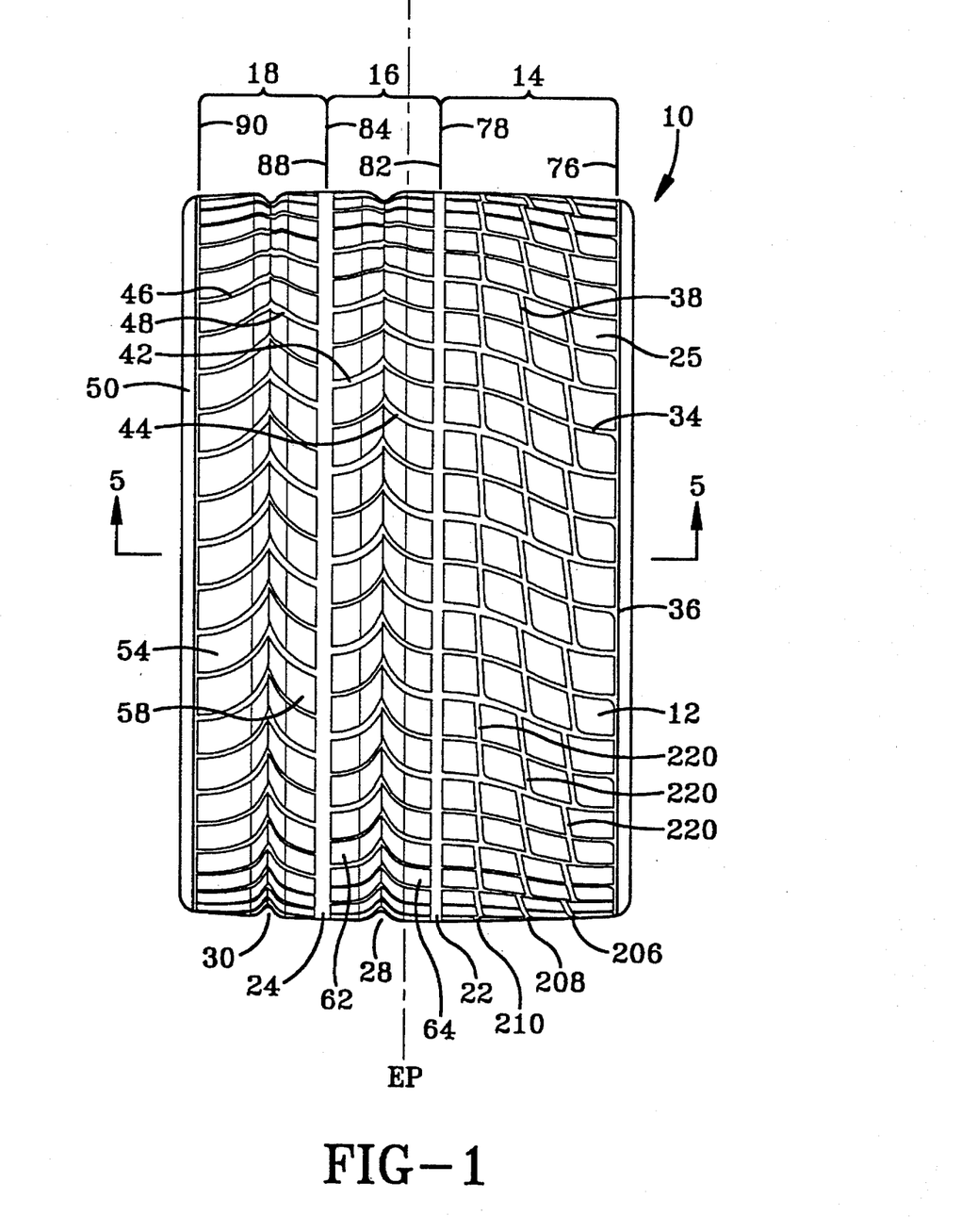
FIG. 1 illustrates a top view of a tire of the invention that is designed to be used, in the illustrated embodiment, on the right front position of the tire/vehicle system.
Figure 5:
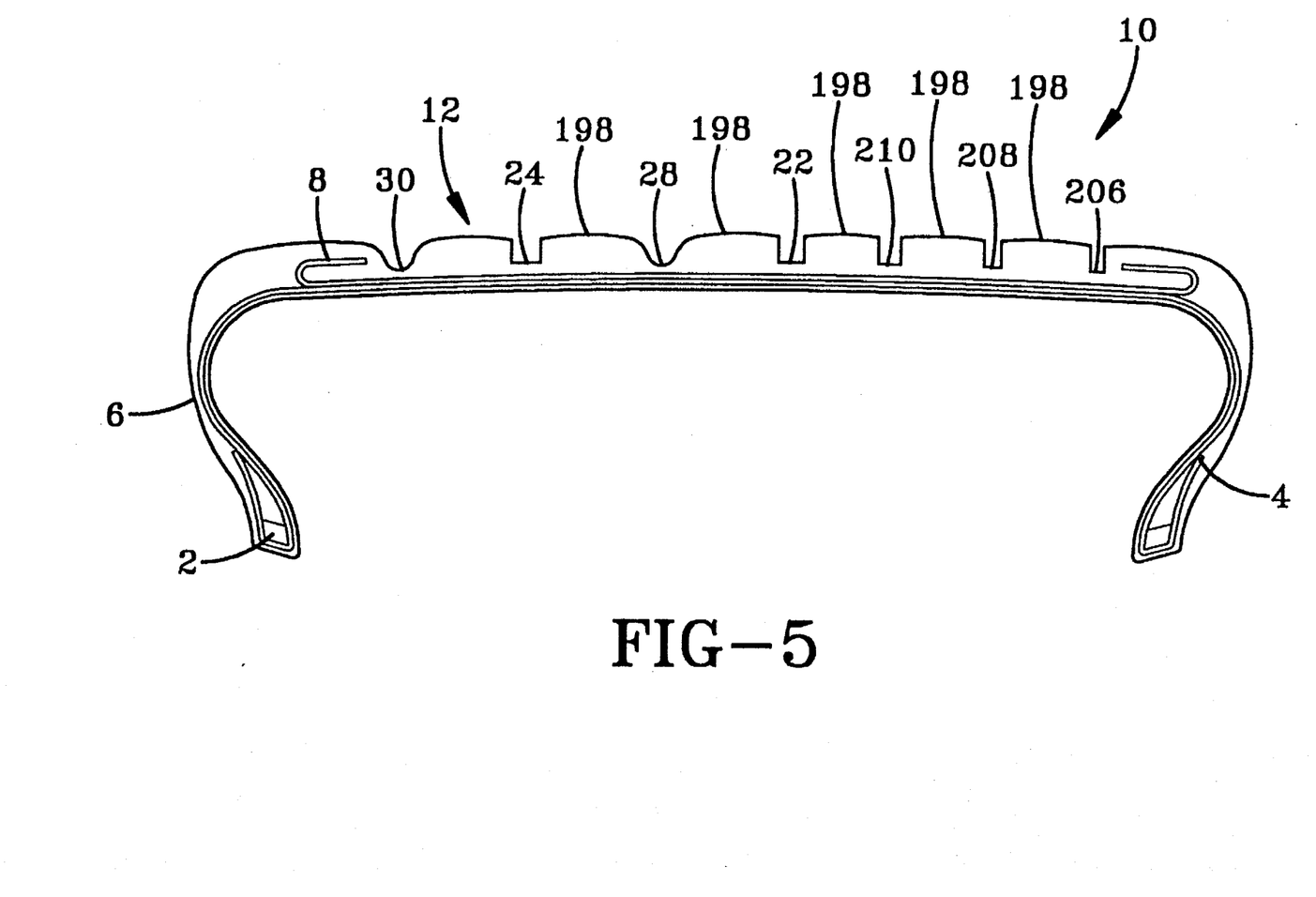
FIG. 5 is a cross-sectional view taken along line 5—5 of FIG. 1 illustrating the curvature of the radially outermost surface of the tread blocks.

With reference to FIGS. 1 and 5, a pneumatic tire as claimed is illustrated. The tire 10 comprises a pair of annular beads 2, at least one carcass ply 4 wrapped around the beads 2, and tread 12 disposed radially over the carcass ply in a crown area of the tire, and sidewalls 6 disposed between the tread and beads.

Figure 3:
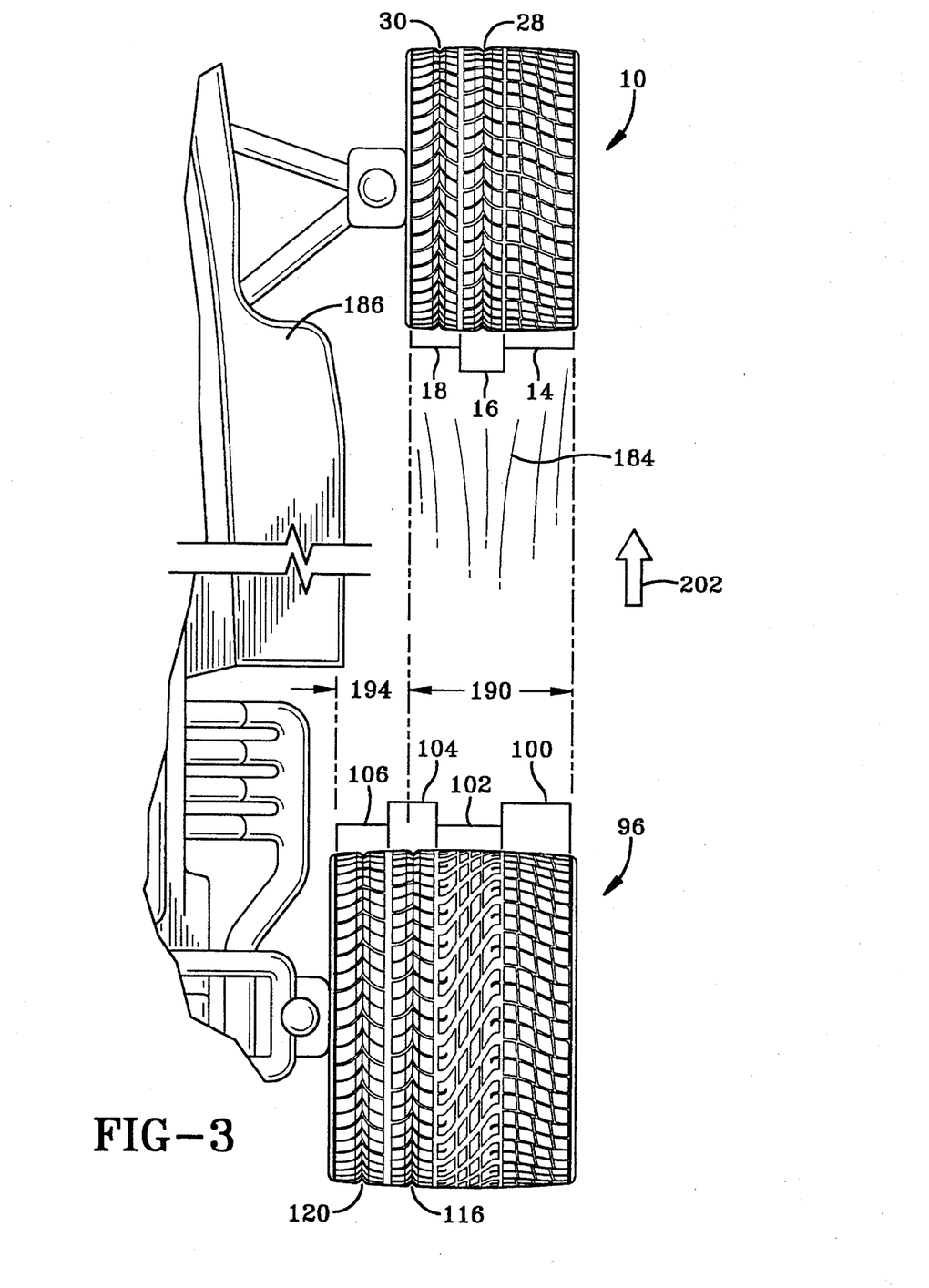
FIG. 3 illustrates a top view of the right half of the tire/vehicle system.
Figure 4:
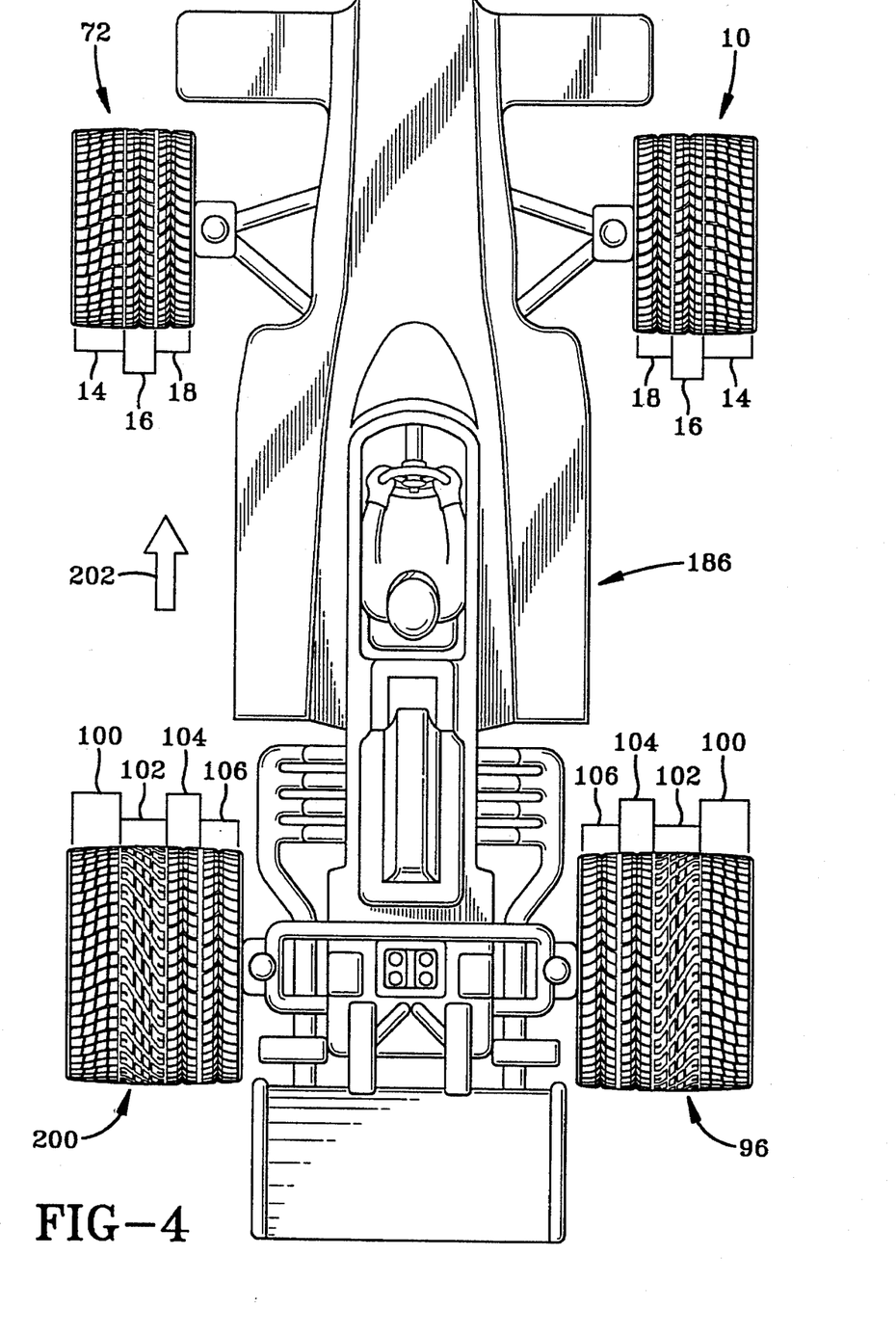
FIG. 4 illustrates a top view of the tire/vehicle system.

With reference to FIGS. 1,3 and 4, tire 10 is designed for and is intended to be used in the right front tire position of a vehicle 186. In the illustrated embodiment of FIG. 4, the left front tire 72 is the mirror image of the right front tire 10 and the description herein for the right side tires are otherwise applicable to the left side tires.

Referring specifically to FIG. 1, the tire 10 has a tread 12 which has first, second and third circumferentially extending zones 14, 16, 18. A first aquachannel 28 is contained within second zone 16 and a second aquachannel 30 is contained within third zone 18. Both the first and second aquachannels 28, 30 are located on one side of the equatorial plane EP of the tire 10. In the embodiment illustrated in FIG. 1, the edges of the zones 14, 16, 18 are defined by centerlines of the continuous circumferential grooves 22, 24. For example, a first edge 76 of the first zone 14 is the tread edge nearest the first shoulder 36 while the second edge 78 of the first zone 14 is the first circumferential groove 22. A first edge 82 of the second zone 16 is the first circumferential groove 22 while the second edge 84 of the second zone 16 is the second circumferential groove 24. A first edge 88 of the third zone 18 is the second circumferential groove 24 while the second edge 90 of the third zone 18 is the tread edge nearest the second shoulder 50

Lateral grooves 34 in first zone 14 provide a substantially continuous path from a first shoulder 36 of the tire 10 into the first aquachannel 28.

Circumferential grooves 38 together with lateral grooves 34 form blocks 25. Circumferential grooves 38 are staggered between every second row of blocks 25, and accordingly, are not continuous around the tire.

Lateral grooves 42, 44 in second zone 16 are arcuate on either side of the first aquachannel 28 so that the lateral grooves 42, 44 from each side of the first aquachannel 28 form a substantially V-shape in the center of the first aquachannel 28.

Similarly, lateral grooves 46 and 48 in third zone 18 are also arcuate as they progress and terminate into second aquachannel 30, thereby forming a substantially V-shape in the second aquachannel 30. Lateral groove 46 provides an arcuate path from the center of the second aquachannel 30 to a second shoulder 50 of the tire 10. Tire tread blocks 54 in third zone 18, near second shoulder 50, are substantially longer laterally than tread blocks 58 located between the second aquachannel 30 and the second circumferential groove 24. The tread depth is also reduced between shoulder 50 and aquachannel 30, i.e., between blocks 54. Similarly tread depth is reduced in the outside shoulder area, i.e. between the shoulder row of blocks 25, about 1 inch to 1 ¼ inch from the shoulder. The reduced tread depth helps stiffen the shoulder area of the tire to improve handling. Also, since in the illustrated embodiment a folded belt 8 (See FIG. 5) is used, the reduced tread depth helps accommodate the folded edges of the belt zone.

Tread blocks 62 and 64 in second zone 16 are substantially symmetrical.

Those skilled in the art will recognize that tread blocks 54 and 56 and tread blocks 62 and 64 may be skewed relative to one another.

First zone 14 comprises 35–50% of the width of the tread 12 and has lateral grooves 34 longer than the width of first zone 14. Second zone 16 comprises between 25% and 35% of the width of the tread 12. First aquachannel 28, contained in second zone 16 has a width of about 7% to 13% of the width of tire tread 12. Third zone 18 comprises about 25% to 35% of the width of the tire tread 12. Second aquachannel 30 comprises about 5% to 11% of the width of the tire tread 12. The tread design utilized on the front tire tread 12 utilizes the aquachannels 28,30 to accommodate water in the footprint of the tire 10, to help prevent or reduce hydroplaning. The location of the aquachannels 28,30 within the tread 12 can be affected by whether or not the tire is designed for a vehicle with cambered wheels.

For example, many vehicles are designed so that the top of the tires tilt or camber inwardly toward the vehicle centerline or outwardly away from the vehicle centerline. In Formula I cars, this camber is generally −4°. Such cambering loads one side of the tire with a higher unit tread pressure, and makes that portion of the footprint longer than the less loaded portions of the footprint.

In the embodiment illustrated in FIG. 1, the second shoulder 50 is the "inside shoulder" which is designed to be closest to the vehicle. Due to the −4° camber used in Formula I vehicles as discussed above, in a tire designed to be used on such a vehicle, the area of the tread 12 nearest the second shoulder 50, i.e. the third zone 18, and to a lesser extent the second zone 16, would bear the highest load and the highest unit tread pressure. For this reason, the tire's footprint in the third zone 18 is longer than in the first zone 14. The longer footprint portion presents difficulty in displacing the water from under the tire tread 12 quickly enough to avoid hydroplaning. To solve this problem, first and second aquachannels 28, 30 are located in the second and third zones 16, 18 to accommodate water which is unable to exit the footprint through the lateral grooves 46. Because of the high load expected, the tread blocks 54 in the third zone 18 are made relatively stiff, being well buttressed and relatively large.

The lateral edge 220 of blocks 25 in zone 14 are angled slightly so that the block edges are perpendicular to the slip angle of the tire (the slip angle of the tire is important when the vehicle is going around a curve, such as on a round or oval race track), and helps maintain lateral grip. Blocks 25 closer to the center of the tire have a circumferential-edge 220 having an angle of about 6° with respect to the EP of the tire, the row of blocks next to the shoulder row of blocks have a circumferential edge 220 angle of about 8°, and the row between them has an edge 220 having an angle of about 7°.

Another important feature of the first zone 14 is the gradually decreasing circumferential groove width as one moves from the tire's first shoulder 36 toward the tire's equatorial plane EP. With reference to FIG. 1, circumferential groove 206 is narrower than circumferential groove 208, which is in turn narrower than circumferential groove 210. The importance of this feature is that as the race track begins to dry out, the tire 10 begins to deform more, due to the fact that the dry road surface provides greater traction. When the tire 10 adheres to the road surface with greater traction, lateral forces on the tire 10 increase, and groove 206 narrows so that blocks 25 almost touch laterally because the tire 10 deforms when encountering lateral forces, instead of breaking free from the road surface. Under such deformation, tread blocks 25, near the first shoulder 36 nearly touch. In such case, the tread stiffness of the blocks 25 is very high, similar to the smooth tires commonly used in racing on dry tracks and known as "racing slicks." As the road surface dries out, the tread blocks 25 nearest the first shoulder 36 come more and more in to play as tire deformation increases and, in such case, behave more and more like a racing slick as is commonly used on dry road surfaces.

When tire traction increases, along with the resultant greater lateral forces, it is important that tread blocks be strong enough and buttressed enough to withstand the lateral forces.

Each of circumferential grooves 206, 208, 210 are narrower in the leading part of the tread than in the trailing part of the tread, i.e., these grooves get wider as the tire passes through the footprint, reducing the force on expelled water, and together with the staggering of the blocks, help direct water into lateral grooves 34 and out of the footprint.

Due to the camber of the tire 10, the first portion 14 of the tread 12 does not contact the road surface with significant unit tread pressure unless the tire 10 is experiencing relatively high lateral forces.

Figure 2:
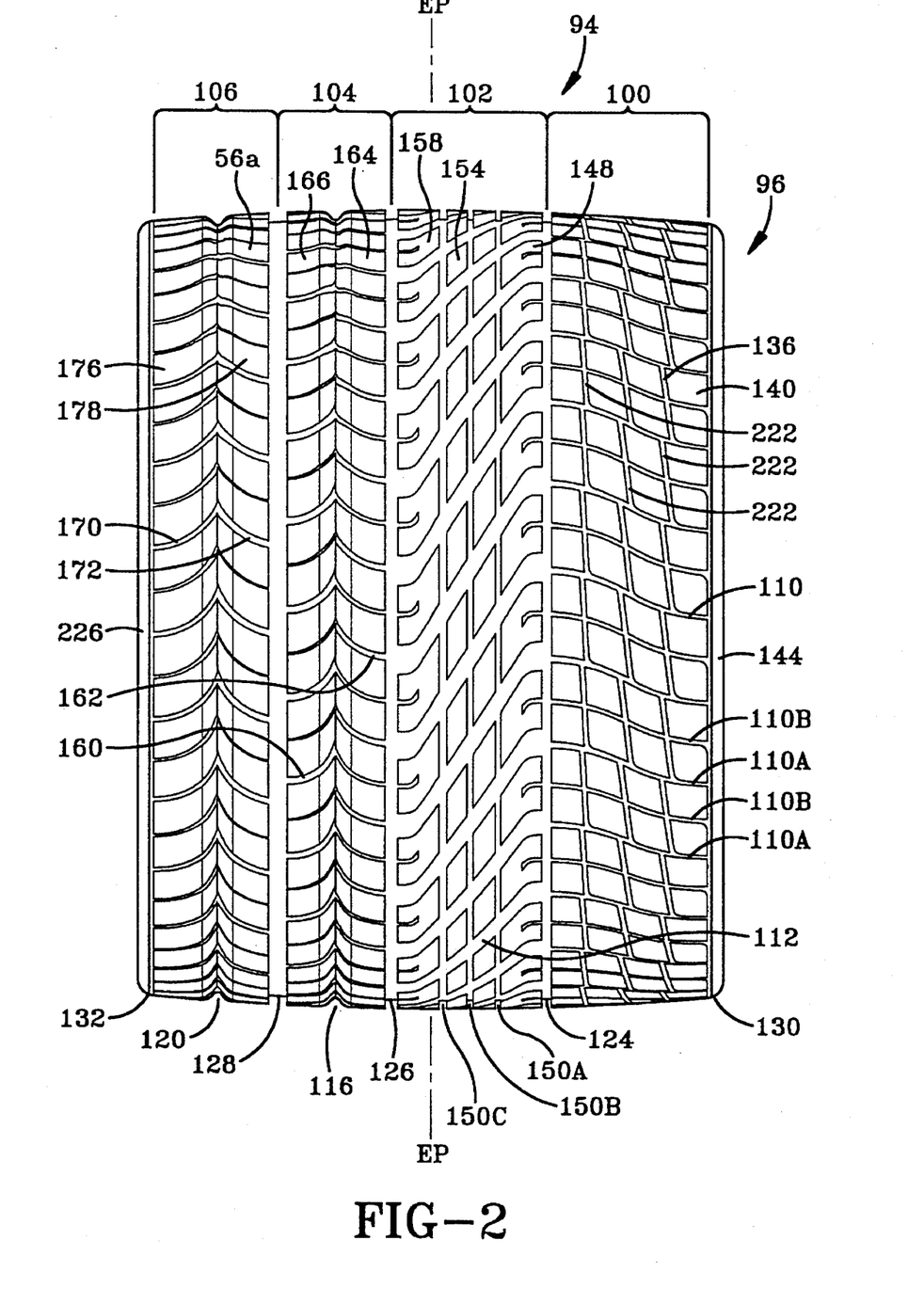
FIG. 2 illustrates a top view of a tire of the invention that is designed to be used on the right rear position of the tire/vehicle system.

With reference now to FIG. 2, the tread 94 of a rear tire 96 according to the invention is illustrated. In the illustrated embodiment, tread 94 is designed for a tire intended to be used at the right rear wheel position of a vehicle, as illustrated in FIGS. 3 and 4.

Tread 94 is characterized by four circumferentially extending zones 100, 102, 104, 106. First zone 100 comprises about 25% to 31% of the width of the tire tread 94. The first zone 100 has lateral grooves 110 longer than the width of the first zone 100. Second zone 102 comprises about 22% to 30% of the width of the tire tread 94. Second zone 102 has substantially parallel lateral grooves 112 angled at ±30° to 60° with respect to the equatorial plane EP of the tire 96. Third zone 104 comprises about 14% to 22% of the width of the tire tread 94. Third zone 104 has first aquachannel 116 therein. Fourth zone 106 comprises about 15% to 26% of the width of tire tread 94. Fourth zone 106 has second aquachannel 120 therein. The aquachannels 116, 120 each have a width comprising between 4% and 8% of the tread width.

Each of the four zones 100, 102, 104, 106 is defined at its edge by a continuous circumferential groove 124, 126, 128. The edges of the first zone 100 are the first tread edge 130 and the centerline of the first circumferential groove 124. The edges of the second zone 102 are the centerline of the first circumferential groove 124 and the centerline of the second circumferential groove 126. The edges of the third zone 104 are the centerline of the second circumferential groove 126 and the centerline of the third circumferential groove 128. The edges of the fourth zone 106 is the second tread edge 132 and the centerline of the third circumferential groove 128.

With continuing reference to FIG. 2, the lateral grooves 110 and circumferential grooves 136 in the first zone 100 form tread blocks 140. The lateral grooves 110 are substantially continuous from a first shoulder 144 of the tire 94 to the first circumferential groove 124.

Lateral grooves 110B terminate in border blocks 148 of the second zone 102. Every second lateral groove 110A matches with a lateral groove 112 in second zone 102, and together are continuous from tread edge 130 at least to circumferential groove 126.

The circumferential grooves 136 are actually a series of groove segments which are staggered, because every second row of tread blocks 140 are slightly offset. As such, the circumferential grooves 136 in the first zone 100 are not continuous. In the second zone 102, the intersections of continuous lateral grooves 112 and continuous circumferential grooves 150A, 150B, 150C form intermediate tread blocks 154 and border blocks 148, 158. Circumferential groove 150A is narrower than circumferential groove 150B, which is in turn narrower than circumferential groove 150C.

The difference in groove width provides the same function as related above regarding grooves 206, 208, 210. In third zone 104, lateral grooves 160, 162, together with the first aquachannel 116 and second and third circumferential grooves 126, 128 form tread blocks 164, 166. Blocks 164, 166 may be staggered relative to one another, but are otherwise mirror images of each other. In fourth zone 106, lateral grooves 170 and 172 are arcuate and form a substantially V-shape in the second aquachannel 120. Tread blocks 176 are laterally longer than tread blocks 178, and may be offset relative to one another, but otherwise are substantially mirror images of one another. The lateral grooves 170, 172 in the fourth zone 106, together with the second tread edge 132, the second aquachannel 120 and the third circumferential groove 128, form tread blocks 176, 178.

The tread blocks 140 in the first zone 100 feature a large number of lateral edges 222 which are oriented to be perpendicular to the slip angle of the tire and which provide lateral grip in the rear tire 96. In the illustrated embodiment, the block edges in the row of blocks closest to the center of the tire may vary from about 5° to 10°.

In second zone 102, a relatively low net-to-gross ratio enables this zone of the tire 96 to accommodate water trapped within the footprint. Because second zone 102 is located near the middle of relatively wide tire 96, it is difficult for the water to travel from the footprint via the lateral grooves in the short period of time the water is underneath the tire 96. Therefore, near the center of the tire 96, a low net-to-gross ratio provides greater void volume to accommodate water near the center of the footprint while allowing tire tread blocks 148, 154 to maintain good contact with the road surface.

Another important feature of second zone 102 is the circumferential stiffness of the tread blocks 148, 154 within the zone. Due to the power generated by race car engines, which is transmitted to the rear wheels through the vehicle drive train, the center portion of the tire 96 can experience significant circumferential stresses. The relatively high angle of the lateral grooves 112 create intermediate tread blocks 154 which are relatively long and which are circumferentially stiff and able to withstand the circumferential stresses.

Third and fourth zones 104, 106 of tire 96 have relatively low net-to-gross ratios due to the first and second aquachannels 116, 120 to effectively handle an disturbed water in this region of the rear tire 96, where accommodation of the such water is necessary due to an extra long footprint portion near the second shoulder 226. Tread blocks 164, 166, 176, 178 are heavily buttressed because the tread unit pressure is high in this area. Therefore, the aquachannels, in an area of the tread having stiff and well buttressed tread blocks, allows this portion of the tread to be stiff and yet have a low net-to-gross ratio, qualities which usually do not go together.

With reference to FIG. 3, in the operation of the inventive tires 10, 96 on a vehicle 186, if the void areas in the tire tread 12, 94 are too small, a portion of the water on the road surface is trapped between the tread blocks and the road surface. This results in unacceptable tire traction and vehicle handling. To alleviate this problem, aquachannels 28, 30 of tire 10 help prevent hydroplaning of tire 10 by providing an escape or flow path for water in front of tire 10. With reference to FIG. 1, lateral grooves 34 channel water from the front portion of the tire 10 toward the first shoulder 36. As tire 10 passes over the road surface, water on the road surface is disturbed, and a substantial portion of the water on the road surface is dispersed to the side of the tire 10, so that in general, an area 184 behind tire 10 will be substantially dry pavement. In contrast, an area 194 of the pavement which does not track tire 10, will be substantially undisturbed. But because of the water pushed aside by tire 10, area 194 will often contain more water than other surrounding portions of the road surface. Accordingly, when the rear tire 96 tracks over the pavement behind tire 10, zones 100, 102, 104 will track over the area 190 and will be contacting relatively dry pavement, and tire 96 is able to provide substantial lateral traction because of the high net-to-gross area in first zone 100 of the tread 94. Meanwhile, first and second aquachannels 116, 120 help prevent build up of water in front of the tire 96 in area 194 by helping to accommodate water in fourth zone 106 and part of third zone 104 of the tire contact area.

With reference now to FIG. 5, in both the front and rear tires 10,96, the radially outermost surface 198 of the tread blocks are convexly curved. In the preferred embodiment, this curvature is in the axial direction only; the circumferential direction has no curvature apart from the usual curvature associated with a round tire. The curvature of the surface 198 of the tread block helps move water from the center of the tread block to the tread grooves. The curvature shown in FIG. 5 is exaggerated for clarity. The width variation between circumferential grooves 206, 208, 210 are also exaggerated for clarity.

With reference to FIG. 4, the vehicle 186 has two front tires 10, 72 and two rear tires 96,200. In the normal mode of operation, the vehicle 186 is driven in the direction of arrow 202 so that each front tire 10, 72 precedes each rear tire 96,200, respectively, although the vehicle 186 may be driven in the reverse direction, for example, when parking.

The rear tire 96 is mounted so that at least a portion of the rear tire 96 longitudinally tracks at least a portion of the front tire 10. Likewise, rear tire 200 is mounted so that at least a portion of the rear tire 200 longitudinally tracks at least a portion of the front tire 72. While the vehicle 186 is illustrated as a race car, and the invention was designed primarily for use in racing on wet tracks, the scope of the invention is not limited to race tires and has numerous applications including high performance tires designed to be used on conventional roads.

While specific embodiments of the invention have been illustrated and described, those skilled in the art will recognize that the invention can be variously modified and practiced. The invention is limited only by the following claims.

What is claimed is:

1. A pneumatic tire comprising a pair of annular beads, at least one carcass ply wrapped around said beads, tread disposed radially over said carcass ply in a crown area of said tire, and sidewalls disposed between said tread and beads wherein said tread has aquachannels on only one side of the equatorial plane of the tire and comprises, (a) a first zone comprising 35–50% of the width of said tire tread and containing lateral grooves longer than the width of said first zone wherein said first zone comprises block elements which are staggered axially such that circumferential grooves between said blocks are not continuous around the tire, (b) a second zone in a center portion of said tire and comprising 25–35% of the width of said tire tread and having a first aquachannel of the aquachannels therein, said first aquachannel comprising 7–13% of the width of said tire tread, in which said second zone has arcuate lateral grooves that enter said first aquachannel from each side thereof to form a substantially V-shape, and (c) a third zone comprising 25–35% of the width of said tire tread and having a second aquachannel of the aquachannels therein, said second aquachannel comprising 5–11% of the width of said tire tread, in which said third zone has arcuate lateral grooves that enter said second aquachannel from each side thereof to form a substantially V-shape, and wherein each said zone is separated from the adjacent zone by a continuous circumferential groove.

2. The tire of claim 1 wherein both aquachannels have a combined width of 14–22% of the tread width of said tire.

* * * * *